Feb. 13, 1934.  E. H. HORNS  1,946,855
CAMERA
Filed Sept. 15, 1932
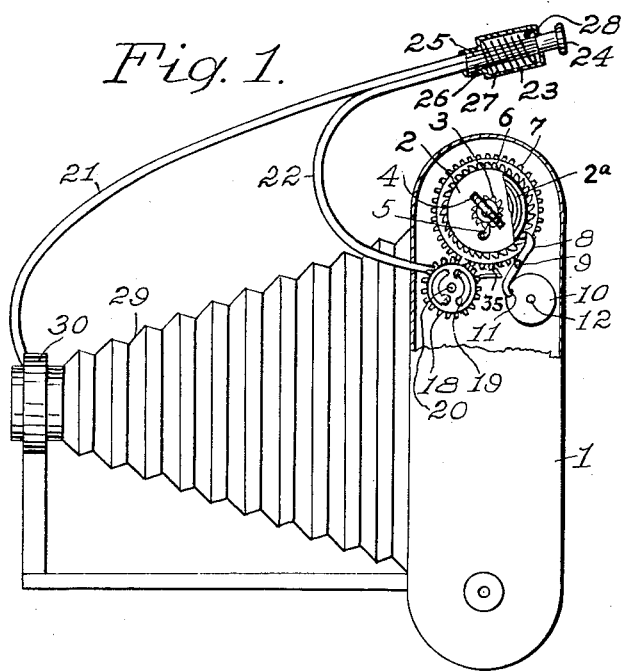
Fig. 1.
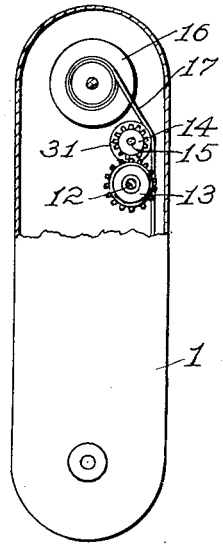
Fig. 2.
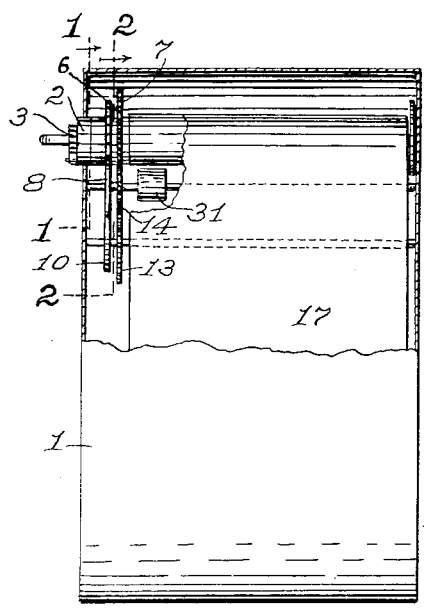
Fig. 3.
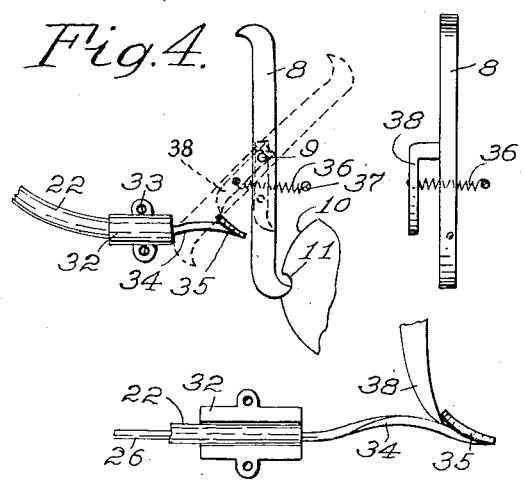
Fig. 4.
Fig. 5.
Fig. 6.
INVENTOR
Edward H. Horns,
BY G. C. Kennedy
ATTORNEY Patented Feb. 13, 1934

1,946,855

UNITED STATES PATENT OFFICE 1,946,855

CAMERA

Edward H. Horns, Waterloo, Iowa, assignor of one-half to Winfield F. Horns, Bemidji, Minn.

Application September 15, 1932
Serial No. 633,317

4 Claims. (Cl. 242—71)

My invention relates to improvements in cameras, and the object of my improvement is to provide associated releasable and automatic locking mechanism adapted to prevent any accidental retention of an already exposed portion of a film in one position where by an oversight a second exposure may be made thereon.

Another object of my improvements is to furnish an inertia braking means actuable upon the manually operated film roller.

These objects I have accomplished by the means which are hereinafter described and claimed, and which are illustrated in the accompanying drawings, in which Fig. 1 is a side elevation of a hand photographic camera as extended, with a side portion broken away on the broken section line 1—1 of Fig. 3, a part of the manually operable device for locking the film being shown in longitudinal section. Fig. 2 is a like view of the camera, with the bellows extension not shown, and having a portion removed on the broken section line 2—2 of said Fig. 3. Fig. 3 is a rear elevation of the camera casing with a portion broken away to disclose the locking means for the inclosed rollable film and other devices. Fig. 4 is a detail view, on a larger scale, of the coacting separable locking devices, with a part of one broken away, and dotted lines indicating one of the operating positions of these coacting elements. Fig. 5 is a side elevation on a still larger scale of the said coacting locking elements in a different coacting position from those of said Fig. 4. Fig. 6 is a front elevation of the branched pawl element of said coacting devices.

The photographic hand camera 1 has the usual collapsible extension 29 with lens grid or holder 30 and flexible tube 21 containing a flexible wire member 25 actuable by means of a plunger 24 moving in a casing 23 and controlled by a spring 27 and pin 28 in the casing reactively to open and close the shutter for the lens. The plunger 24, however, has another and like flexible wire 26 traversing another and flexible tube 22 whose farther end is seated in a terminal sleeve 32 made in mating halves secured together by screws 33 traversing mating apertured ears on the halves. The wire 26 beyond the sleeve 32 is curvilinearly shaped and has a hooked termination 35 beyond its curved part 34.

Referring to said Fig. 1, the casing of the camera 1 contains at its upper and lower ends rotatable spools of the usual type upon which may be rolled a strip of film 17. The upper spool has a terminal manually rotatable spring barrel 2 of the usual kind, the central hub of whose spiral spring 2a extends without the barrel and carries a ratchet-wheel 3 having a finger-grip part 4 and engaged by a small pawl 5, pivoted on the barrel end, for tensioning and governing the spring. Any slack in the intermediate part of the film strip 17 between the spools 16 is taken up by a small roller 31 mounted on a rotatable shaft 15, the roller being rotated frictionally by the moving strip, this shaft also carrying a small gear-wheel 14 at one side of the strip 17 which is in mesh as shown in Fig. 3, also in Fig. 2, with a larger gear-wheel 13 on a parallel rotatable shaft 12 in the casing. On the adjacent end of said shaft 12 relative to the gear 13 is fixed a disk 10, shown in Fig. 1, and having a single edge notch or recess 11.

The upper spool 16 carries both a ratchet-wheel 6 and a gear-wheel 7, the former in the same plane which contains the disk 10 and spaced therefrom. The numeral 8 denotes a double-ended pawl device whose terminal detents extend therefrom oppositely relatively to each other, one detent engageable with teeth of the ratchet-wheel 6 at times, and the other detent engageable with the wall of the notch 11 in the disk 10 at times.

Referring again to said Fig. 1, the numeral 18 denotes a small gear-wheel in mesh with the gear 7 and mounted on a shaft 20. Upon the outer face of the gear 18 at opposite sides thereof the equal and like arcuate weights 19 are pivoted to the gear at their ends respectively opposite the free ends of each other, whereby when the spool is rotated the gear 18 is speeded up more than the gear 7, and the weights act alike in centrifugal swinging to retard by their inertia, the gear 7 and spool 16 from sudden change of speed and thus brakes the spool for even rotation.

Referring now to Figs. 4 to 6 inclusive, the double-ended pawl 8 has its end detents normally engaged respectively with teeth of the ratchet-wheel 6 and with the notch 11 of the disk 10, and thus the spools are locked against rotation. The pawl 8 has an offset and downturned branch or finger 38 having a coiled tension spring 36 connected to it, so that the pawl is kept in engagement with said ratchet-wheel 6 and disk 10.

When the film has been exposed, the operator may unlock the pawl 8 by pressing in the plunger 24, the wire 26 propelling the end hook 35 in a direction toward the lower end of the pawl, until the barb of the hook slides past the finger tip 38 and past it as shown in Fig. 5, when the barb springs into the plane of the finger 38 and engages it at the end of the barb, the curvate portion 34 yieldingly allowing this side movement. The operator on releasing the plunger 24 permits the spring 27 to react to draw out the plunger together with the wire 26, thus the barb of the hook 35 will pull upon the tip of the finger 38 swinging it as shown in Fig. 4 until the finger slips off the hook as indicated in dotted lines. The pawl is thus disengaged at its detents respectively from the ratchet wheel 6 and the notch 11 of the disk 10, and the spring 36 then returns the pawl to its first position to engage the ratchet-wheel and disk.

As the release of the pawl 8 automatically unlocks the said mechanism, the spring-barrel acts to roll the film upon the upper spool 16, and in this movement upwardly of the film its rubbing contact with the rubber roller 31 rotates the latter, its shaft 15, the meshed gears 14 and 13, the shaft 12 and the disk 10, the latter rotating once to place the notch where it is in time to be reengaged by the returning and released lower detent of the pawl 8. Thus the film is held against accidental displacement, and as the film has exposed a fresh surface, another exposure can be made without liability of a double exposure of the film.

Having described my invention, what I claim as new, and desire to secure by Letters Patent, is:

1. In a camera, in combination, manually operable mechanism for carrying and rolling up a film and including a spring barrel carrying an annular ratchet-wheel thereon, a rotatable disk having a single edge notch, a medially pivoted double end dentated pawl having an offset arm between said disk and ratchet-wheel normally engaging both, means for pushing, end-engaging, and when released disengaging from said offset arm releasably to disengage the pawl from the disk and ratchet-wheel simultaneously and resiliently, and intervening mechanism between said disk and the film carrying mechanism adapted to be moved by engaging contact with the moving film to rotate the disk into a position to have its notch reengaged by said pawl while the pawl becomes reengaged with the ratchet-wheel.

2. In a camera, in combination, manually operable mechanism for carrying and rolling up a film and including a spring barrel carrying an annular ratchet-wheel thereon, a rotatable disk having a single edge notch, a medially pivoted double end dentated pawl between said disk and ratchet-wheel normally engaging both and having an offset arm, a manually actuable resiliently controlled means including a hook releasably engageable with the offset arm of said pawl to disengage the pawl from the disk and ratchet-wheel, and operating connections between the film and said disk to rotate it into position to reengage the pawl.

3. In a camera, in combination, manually operable mechanism for carrying and rolling up a film strip and including a spring barrel carrying an annular ratchet wheel thereon, a rotatable disk having a single edge notch, a rotatable shaft upon which it is secured, a gear wheel on said shaft, a parallel rotatable shaft carrying a pinion in mesh with said gear wheel and also carrying a friction roller positioned to frictionally contact with the film strip to be rotated by the strip when in movement, a manually actuable resiliently controlled flexible wire rod having a flexibly barbed end hook, a double ended medially pivoted and end dentated pawl normally engaged with both said ratchet-wheel and with the notch in said disk, and said pawl having an offset arm on its part which engages said disk resiliently connected to anchoring means for normally yieldingly retaining the adjacent end detent of the pawl engaged with said notch, said end hook being propellable yieldingly past the free end of said offset arm to have its barb engage it yieldingly and react to hook upon the tip of the arm, whereby when said manually actuable rod is released and resiliently returned, the barb will rock the arm in one direction to release the pawl detent from the disk notch, the arm becoming disengaged from the barb at a certain length of swing of the pawl to cause the pawl to be returned into engagement with the disk notch.

4. In a camera, the combination with manually operable resiliently controlled mechanism for carrying and rolling up a strip of film, means having duplex ratcheting elements for at times locking said mechanism, said means including a pivoted rockable pawl with detented arms, one arm having its detent curved in one direction of rocking, the latter arm having an offset arm with an end detent curved in the same direction of rocking, and other means for releasably unlocking said locking means, including a resiliently controlled reciprocatingly movable member having an end hook with its barb directed rearwardly, said barb being adapted to be pushed forwardly against the curved edge of said offset arm to rock it and the pawl while sliding over said curved edge to engage the rear end of the bar with the tip of the detent of said pawl arm, the said member when released reacting to rock back said pawl arm until said barb becomes detached from the pawl detent, and the pawl detents then again locking said mechanism by reengaging with its ratcheting elements.

EDWARD H. HORNS.